Jan. 19, 1932.  J. C. DAWSON  1,842,249
METHOD AND APPARATUS FOR MANUFACTURING LOOSE LEAF BINDERS
Filed Dec. 6, 1930
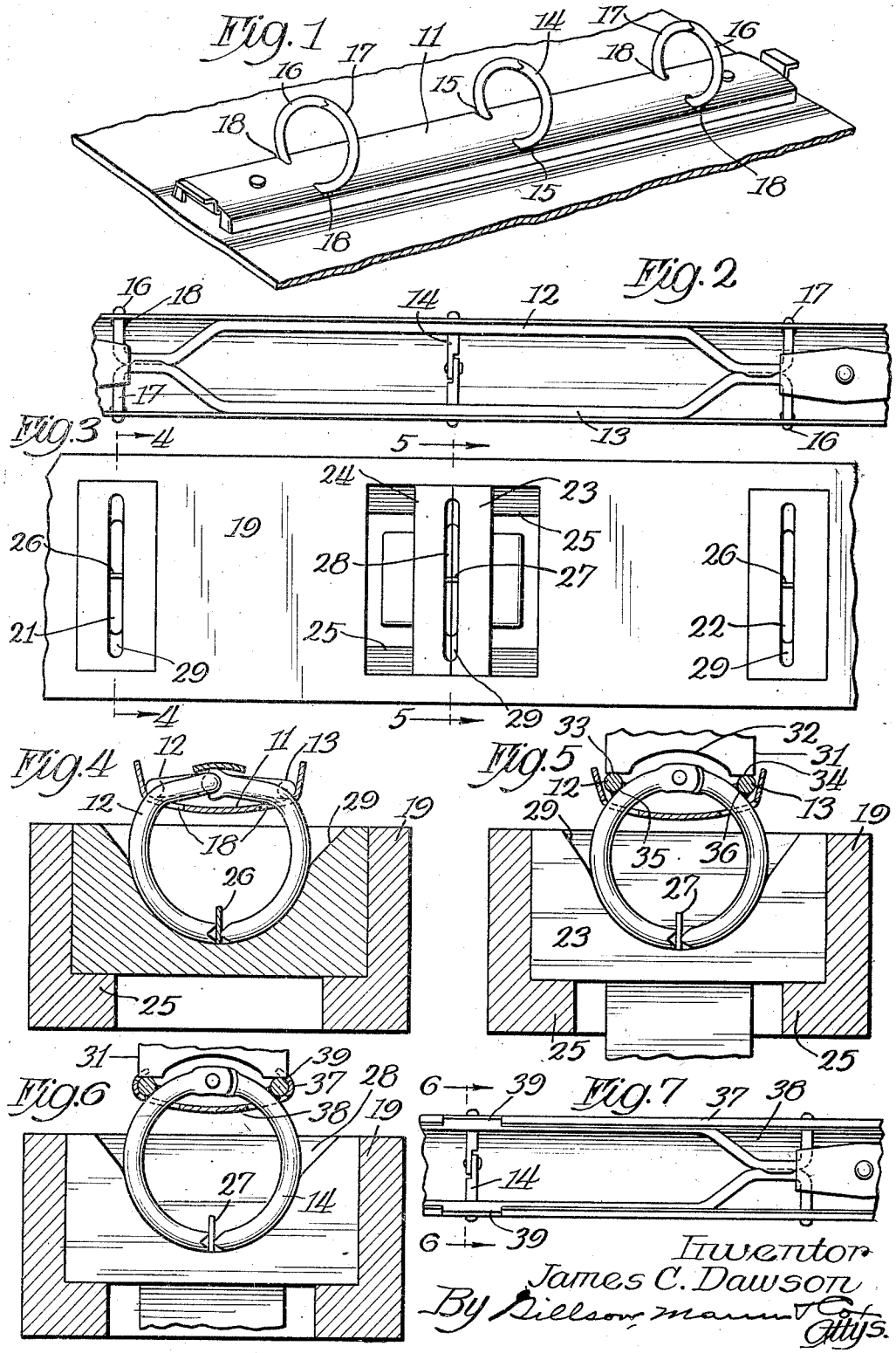
Inventor
James C. Dawson
By Dillson, Mann & Co.
Attys.

Patented Jan. 19, 1932

1,842,249

UNITED STATES PATENT OFFICE

JAMES C. DAWSON, OF WEBSTER GROVES, MISSOURI, ASSIGNOR TO ELMA N. DAWSON, OF WEBSTER GROVES, MISSOURI

METHOD AND APPARATUS FOR MANUFACTURING LOOSE LEAF BINDERS

Application filed December 6, 1930. Serial No. 500,449.

This invention relates to loose leaf binders and has for its objects to provide a method and apparatus for attaching prongs to the toggle bars of such binders; to attach intermediate prongs to the arch frames of binders of the wire arch frame type; and to provide means to cause the free ends of the prongs to be properly aligned.

In the drawings,

Fig. 1 illustrates in perspective a binder made in accordance with this invention;

Fig. 2 is a bottom plan view of the binder illustrated in Fig. 1;

Fig. 3 is a top view of the lining jig and bottom welding electrode;

Fig. 4 shows the jig in cross section on the line 4—4 of Fig. 3 with a wire arch frame closed in its proper position therein;

Fig. 5 is a transverse section of the bottom electrode on the line 5—5 of Fig. 3 showing the paper holding ring closed in its proper position therein;

Fig. 6 indicates the modification necessary in the crimped margin type of binder to adapt it to my process and shows the bottom and top electrodes with the ring closed in its proper position; and Fig. 7 is a bottom plan view of a portion of a crimped margin wire arch frame binder.

Binders of the type illustrated in Fig. 1 are composed of a cover plate 11 and two wire arch frames 12 and 13, which, preferably, are identical and are placed in reverse and opposing relationship.

In assembly, the paper holding ring 14 is thrust through the clearance apertures 15, 15 of the cover 11 and immediately thereafter the arch frames 12 and 13 having their ends formed into the paper holding arches 16 and 17 are assembled in the cover 11 with their arches protruding through the clearance apertures 18. An electrical spot welder carries the jig 19, illustrated in Fig. 3. The jig is provided with arcuate slots 21, 22 into which the arches 16 and 17 are fitted. The bottom welding electrode is split into two parts 23 and 24 which may slide along the track 25 provided in the jig 19.

As is shown in the figures, a thin blade 26 projects upwardly from the extreme bottom of the arcuate slots 21 and 22 and a split blade 27 is set into the side of the arcuate slot 28 cut in the face of the welding electrodes 23 and 24.

When the paper arches and the ring are opened and then inserted into the jig, the inclined face 29 upon the jigs closes the arches as they are forced down to seat in the bottom of the slot, but the blades 26 and 27 keep the ends of the prongs apart and center the apparatus so that the openings of all the prongs will be in line. The two halves of the bottom welding electrode 23 and 24 are then tightly closed together to grip the ring 14 firmly. The upper welding electrode 31, which is cut away at 32 to give clearance to the arched portion of the ring, is then brought to bear on the wire arch frames 12 and 13 at the points 33 and 34. The ring 14 is thus spot welded to the wire arch frames at the points 35 and 36. The lower electrode is now opened and the binder removed.

Wire arch frame binders of the type just discussed pivot upon the outer margin of the holes 15 and 18. Another common type of wire arch frame binder pivots along the curved margins 37, 37 of the cover 38, Fig. 7. In this case, it is necessary to cut back the margins as at 39, 39 to give clearance for the welding electrode 31.

Although it is preferable to use a split ring which is articulated or hinged in some manner, and I have chosen such a ring to illustrate this invention, it is understood that two independent prongs could be applied which are not joined or articulated beneath the cover. I use the term "ring", therefore, to define any structure which is a substantial equivalent of a ring and particularly to denote a pair of prongs which may be closed above the cover and retain paper within their compass.

What I claim, therefore, is:

1. That method of applying intermediate prongs to a loose leaf binder which includes assembling the prongs and arch frames within the cover and then welding the prongs to the arch frames.

2. That method of applying intermediate prongs to a loose leaf binder which consists in assembling the prongs within the cover, assembling the arch frames within the cover, aligning the free ends of the arch frames and the free ends of the prongs and then permanently attaching the prongs to the arch frames.

3. That method of applying intermediate prongs to a loose leaf binder which consists in assembling a split ring and wire arch frames into a cover, forcing the opened ring and opened arch frames into a jig which causes the ring and arch frames to close with their free ends in alignment and then welding the ring to the two arch frames simultaneously.

4. The method of applying intermediate prongs to a loose leaf binder which includes assembling the prongs and arch frames within the cover and then securing the prongs to the arch frames.

5. The method of applying intermediate prongs of a loose leaf binder having arch frames provided with end sheet holding prongs which consists in assembling the intermediate prongs within the cover, assembling the arch frames within the cover, introducing between the free ends of the several sets of prongs an alining bar, and then permanently attaching the prongs to the arch frames.

In testimony whereof I affix my signature.

JAMES C. DAWSON.